Patented May 9, 1939

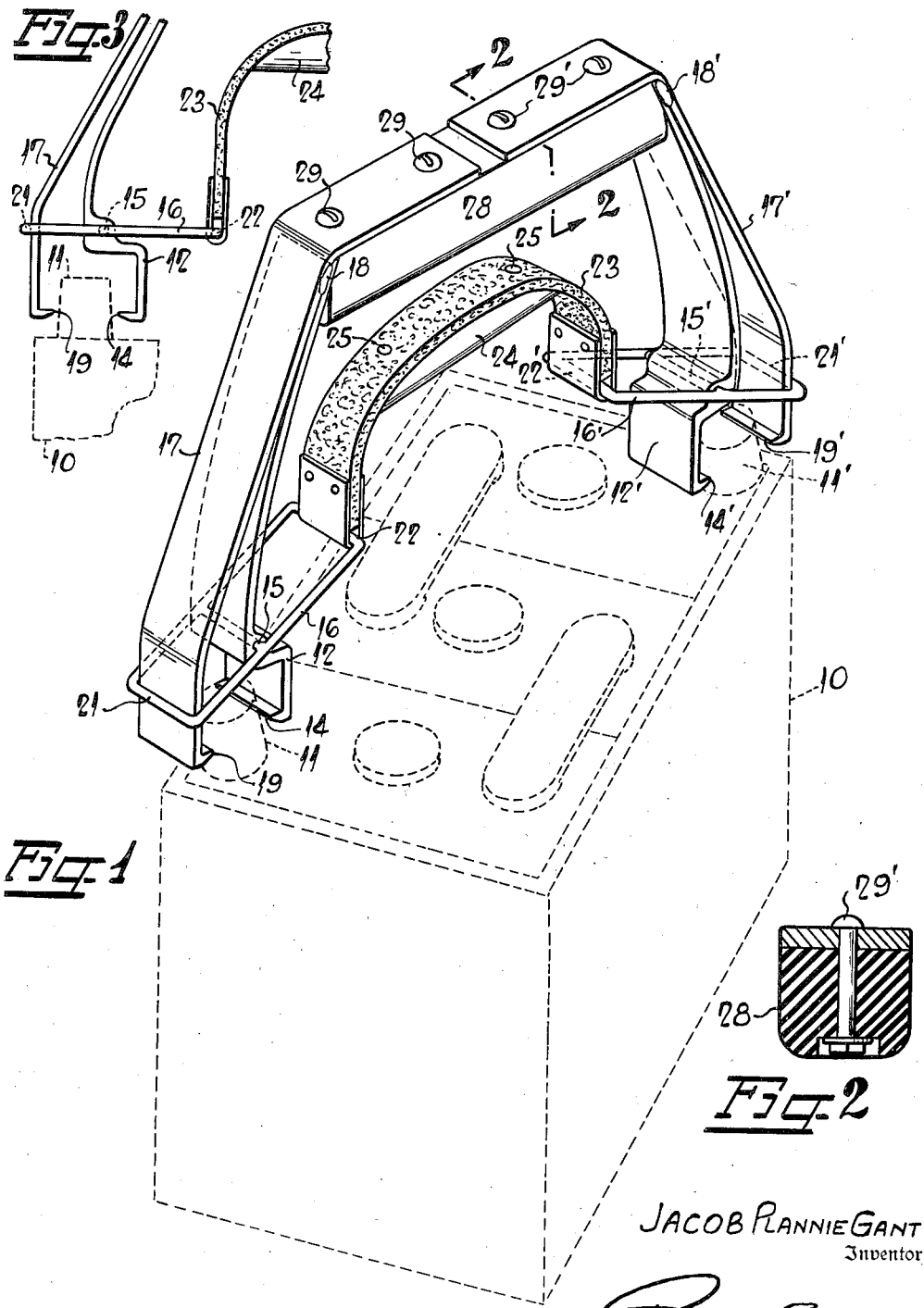

2,157,753

UNITED STATES PATENT OFFICE 2,157,753

BATTERY CARRIER AND LIFTER

Jacob Plannie Gantt, Rock Hill, S. C.

Application January 4, 1939, Serial No. 249,235

3 Claims. (Cl. 294—99)

This invention relates to an apparatus for carrying objects such as batteries and the like from place to place. More specifically it relates to a handle having a plurality of gripping means for engaging an article, the tenacity with which said gripping means engages the article being directly in proportion to its weight.

It is, therefore, an object of this invention to provide a device for carrying objects such as batteries and the like which has gripping means controlled by the weight of the article itself. By providing such a device it is possible to carry heavy objects from place to place and yet rest assured that the grip which the holder has upon the object will increase rather than decrease due to the weight of the object.

It is another object of this invention to provide an article of the class described having a pair of gripping means associated therewith and a flexible connection between said gripping means whereby the distance between the same can be varied. By the provision of this feature, the holder is adaptable to batteries which have posts at variable distances apart.

The device is especially adapted for use in removing and installing automobile, truck and airplane batteries.

Some of the objects of the invention having been stated other objects will appear as the description proceeds, when taken in connection with the accompanying drawing, in which—

Figure 1 is an isometric view of the invention shown associated with a battery;

Figure 2 is a transverse sectional view taken along the line 2—2 in Figure 1;

Figure 3 is an elevation of one end of the invention showing the gripping means in released position.

Referring more specifically to the drawing, the numeral 10 denotes a battery having posts or terminals 11 and 11' extending upwardly from the top side thereof. The proximate sides of the terminal posts are adapted to be gripped by jaws 12 and 12', said jaws having a sharpened laterally projecting edge 14 and 14' integral therewith. These jaws project upwardly for a slight distance and then laterally and have pivoted thereto as at 15 and 15' rectangularly shaped links 16 and 16', respectively. The members 12 and 12' then extend upwardly and are secured to the upper portion of gripping members 17 and 17' as at 18 and 18' by any suitable means such as welding and the like. The lower end of members 19 and 19' have laterally projecting edges 19 and 19' integral therewith which cooperate with the edges 14 and 14' when a post 11 or 11' is to be engaged.

The end portions 21 and 21' of the links 16 and 16', respectively encircle the lower outer surfaces of members 17 and 17'. The inner end portions 22 and 22' of the rectangular links 16 and 16' are secured to the ends of strap 23 which strap is formed from any suitable flexible material such as leather, webbing or the like. The intermediate portion of the strap 23 is re-enforced by a rigid block 24 and this block is fastened to the strap as at 25.

It is preferable to form gripping members 12 and 17 of a spring material, so that there will be a tendency for the edges 14 and 19 to normally spread apart from each other. By having these members normally spread, a battery post can be easily placed in position for gripping.

The upper ends of the members 17 and 17' are secured to rubber link or handle 28 by any suitable means such as bolts or screws 29 or 29', respectively. By providing a connecting link 28 made of rubber or any other resilient material, it is possible to bend this member and thereby vary the distance that the gripping members occupy from each other. This feature will allow the holder to be used on batteries having posts at a variable distance apart. The object in providing a strap 23 of a flexible material is to likewise allow for a variation in the spread of the gripping members.

When it is desired to place the battery carrier in operation, the rectangular links 16 and 16' are placed in a horizontal position as shown in Figure 3, and at that time the gripping edges 14, 14', 19 and 19' are placed on opposed sides of the terminals 11 or 11' of the battery. Then an upward pull is exerted upon the strap 23 which, in turn, will rotate the rectangular link 16 in a counter-clockwise manner and rotate the rectangular link 16' in a clockwise manner to cause the jaws to grip opposed edges of the terminals 11 and 11'. It is seen that since a major portion of the load will be carried by the handle 24 and strap 23 that the weight of the load or battery will constantly tend to increase the grip that the jaws exert upon the terminals 11 and 11'. To release the grippers from the terminals, it is necessary to set the battery down and then the inherent resiliency of the members 17 and 17' will rotate the links 16 and 16' in a clockwise and counter-clockwise direction respectively so that the jaws will be allowed to spread apart from each other.

In the drawing and specification, there has been set forth a preferred embodiment of the invention and although specific terms are employed, they are used in a generic and descriptive sense only, and not for the purpose of limitation, the scope of the invention being set forth in the appended claims.

I claim:

1. A carrier for batteries having two spaced terminals comprising a pair of members for engaging each terminal, a common bridge member to which the ends of the pairs of members are secured, a link pivoted to one of each pair of members and slidably engaging the other member, a strap having its ends secured to said links and being engageable by the hand of an operator in the act of lifting the battery to press said members together to grip the terminals of the battery.

2. A battery tool for handling batteries equipped with a pair of terminals, a resilient member, a pair of prongs secured to each end of the resilient member and engaging the terminals of a battery, one of the prongs being resilient and having a tendency to move away from the terminal with which it is associated, a member pivotally secured on one of each pair of prongs and slidably engaging the other prong, a strap having its ends secured to the pivoted members, whereby when upward pull is exerted on the strap, the prongs will be pressed toward each other to grip the terminals, and the weight of the battery will cause said prongs to continue to engage said terminals until the battery has been placed in a state of rest.

3. A battery lifter comprising a resilient and bendable member, a pair of prongs secured to each end of the resilient member, the lower ends of said prongs being adapted to be placed on each side of the terminal of a battery, a link pivotally secured on one of the prongs and slidably engaging the other prong, a strap connecting the proximate ends of the links, said strap being adapted to be engaged by the hand of the operator to exert upward pull on the strap to thereby cause the prongs to grip the terminals sufficiently to lift the battery as the upward pull of the hand of the operator is increased.

JACOB PLANNIE GANTT.